United States Patent [19]

Hintner

[11] Patent Number: 4,586,756
[45] Date of Patent: May 6, 1986

[54] BRAKE CONTROL VALVE SYSTEM FOR RAIL VEHICLE AIR BRAKE

[75] Inventor: Joseph Hintner, Türkheim, Fed. Rep. of Germany

[73] Assignee: Knorr-Bremse GmbH, Munich, Fed. Rep. of Germany

[21] Appl. No.: 632,749

[22] Filed: Jul. 20, 1984

[30] Foreign Application Priority Data

Jul. 21, 1983 [DE] Fed. Rep. of Germany ....... 3326373

[51] Int. Cl.⁴ ............................................. B60T 15/32
[52] U.S. Cl. ......................................... 303/37; 303/69
[58] Field of Search ...................... 303/36, 37, 38, 39, 303/68, 69

[56] References Cited

U.S. PATENT DOCUMENTS 4,043,605  8/1977  Hart ...................................... 303/37

Primary Examiner—Duane A. Reger
Attorney, Agent, or Firm—Pollock, Vande Sande & Priddy

[57] ABSTRACT

Brake control valve system for rail vehicle air brake, comprising an emergency brake piston (7) having a first piston chamber (9) loaded by the quick action chamber with a much greater volume than its second piston chamber (8) loaded by the brake line. The effective pressure surfaces of the service brake piston and emergency brake piston are substantially identical. The emergency brake piston controls a first quick action exhaust valve (15) for venting smaller amounts of quick action air per unit of time, as well as a valve device (14) containing a second quick action exhaust for venting larger amounts of quick action air. Valve device (14) is pneumatically connected to the control piston (19) of a high pressure/emergency exhaust valve system (16) which operates only upon emergency braking. Piston (19) contains a nozzle (22) through which pressure remaining in the quick action chamber (10) during emergency braking is evacuated in a predetermined time. Piston (19) controls a high pressure seated valve (17) for connecting an emergency air container (3) to the brake cylinder during emergency braking, and a brake line emergency exhaust seated valve (18) providing large cross-sectioned connection of the brake line to atmosphere during emergency braking.

14 Claims, 2 Drawing Figures

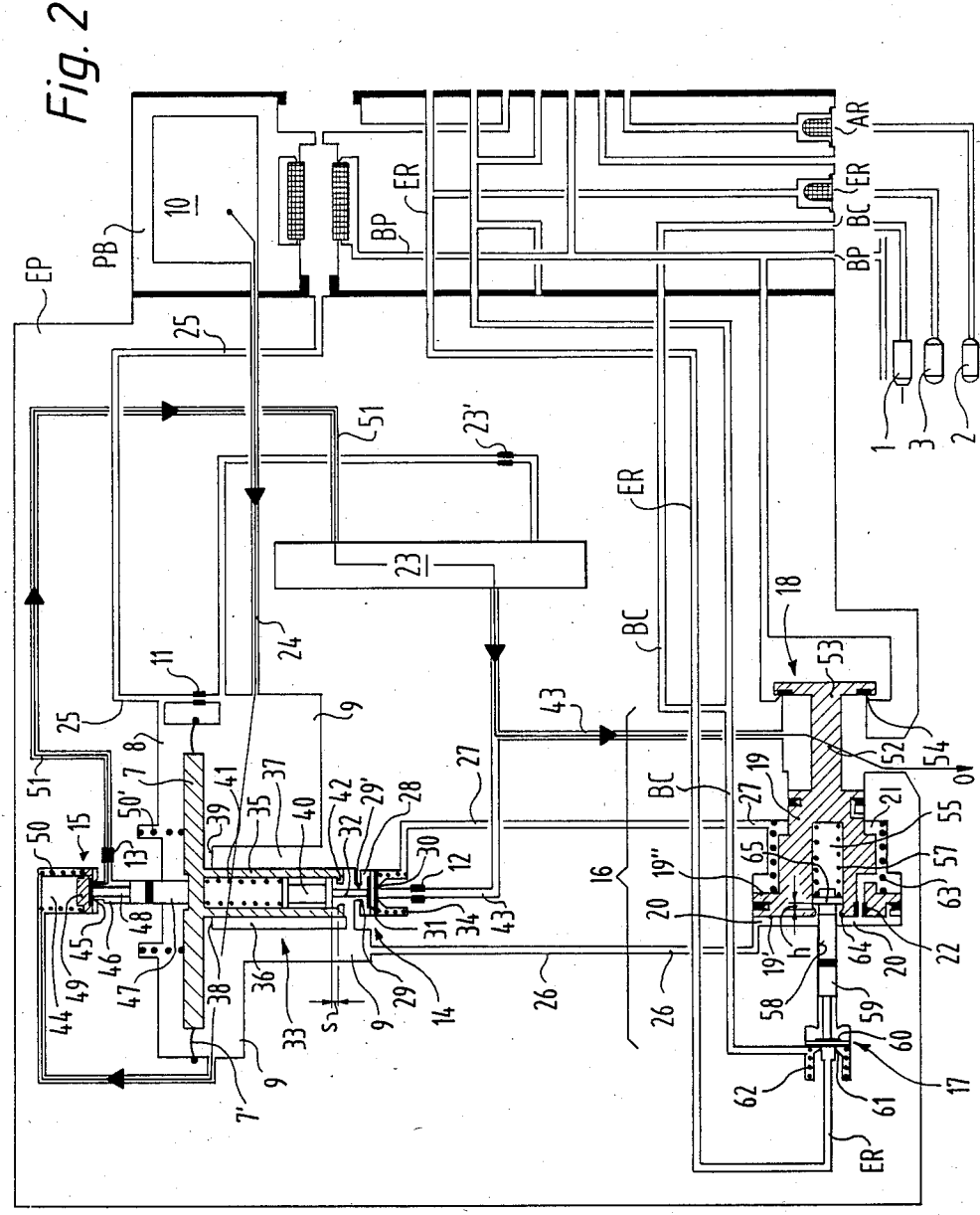

BRAKE CONTROL VALVE SYSTEM FOR RAIL VEHICLE AIR BRAKE

FIELD OF THE INVENTION

The present invention relates to brake control valve systems for rail vehicles.

BACKGROUND OF THE INVENTION

Systems of this kind are known in the art, e.g., from U.S. Pat. No. 4,043,065.

In prior art systems, the emergency brake piston monitors the existence of emergency braking upon every pressure drop in the brake line, by means of a control chamber exhaust valve. Thus, whenever there is a pressure drop in the brake line, the emergency brake piston assists in determining whether service braking or emergency braking is involved.

If service braking is involved, the control chamber (QA chamber) is connected to atmosphere via an exhaust valve, until a predetermined pressure relationship between the brake line pressure and the control chamber pressure is restored at the emergency brake piston. If emergency braking is involved, one control chamber located at one side of the control piston of the high pressure exhaust valve device is also connected to atmosphere, so that the control piston is controlled by the quick action pressure in the other control piston chamber, in order to move the high pressure valve and the brake line emergency exhaust valve to open position.

To perform this task, the emergency brake piston requires a certain sensitivity of reaction to pressure changes in the brake line. In the case of emergency braking, it must cut through quickly enough to produce rapid enough switching of the high pressure exhaust valve device.

Recently, pulsating brake accelerators have been in demand for brake control valves. These repeatedly bleed air pulses from the brake line to atmosphere during each stage of braking. It has proven especially advantageous to actuate such brake accelerators with air from the quick action chamber, which air then flows out to atmosphere. For this purpose, the control chamber is connected to the brake accelerator by a brake accelerator inlet nozzle which is in series with an inlet valve switchd to open position upon even slight pressure drops in the brake line on the basis of a low pressure level.

For control of such a brake accelerator inlet valve, it is known to supplement the emergency brake piston with a separate control piston which, like the emergency control piston, is acted upon by the brake line pressure on one side and the quick action pressure on the other side, and which reacts with sufficient sensitivity to the pressure differences between these. U.S. Pat. Nos. 4,070,068 and 4,206,949 may be referred to in this connection.

In order to minimize the costs of construction, it has proven advantageous to control the brake acceleration inlet valve by means of the emergency brake piston, so as to eliminate the separate control piston. This, however, requires the emergency brake piston to react with sufficient sensitivity to pressure differences between the brake line and the control chamber, and also to cut through quickly enough, upon emergency braking, to effect emergency braking.

U.S. Pat. No. 3,716,276 discloses an emergency brake piston which not only monitors emergency braking but also controls the air for the control of a pulsating brake accelerator. To accomplish this double task, the emergency brake piston controls a gate valve. However, in this type of application, gate valves are inferior to seated valves in various respects.

An emergency brake piston which controls a control chamber exhaust valve on the one hand and a brake accelerator inlet valve on the other hand is known from U.S. Pat. Nos. 4,226,482 and 4,139,239. In these, the brake accelerator inlet valve is already in the form of a seated valve on one side of the emergency brake piston, and the control chamber exhaust valve on the other side of the emergency brake valve is in the form of a gate valve. A disadvantage is that the brake accelerator inlet valve is connected to the brake line, so that the pulsating brake accelerator is actuated by the brake line air escaping to atmosphere through a brake accelerator inlet nozzle. It is further disadvantageous to configure the control chamber exhaust valve as a gate valve. Apart from these disadvantages, the disclosed emergency brake piston, which is acted upon by the brake line pressure on one side and the control chamber pressure on the other side, is not sensitive enough to both control the brake accelerator inlet valve and to sense in sufficient time the existence of emergency braking.

An emergency brake piston which accomplishes the double task of controlling both the control chamber exhaust valve and the brake accelerator inlet valve is disclosed in U.S. patent application No. 492,318. Both valves are in the form of seated valves, and the brake accelerator inlet valve is inserted in a connecting line to the control chamber.

A further simplification of the total construction and maintenance cost of brake control valve systems of the type discussed hereinabove could be achieved if the service brake piston and the emergency brake piston were of substantially the same effective diameter. Since the diameter of the service brake piston must have a certain minimum size due to its function, this size being substantially greater than the functionally required size of the emergency brake piston, equal sizing of the two pistons would cause the latter to be too large, adversely effecting the need for maximum switching speed during emergency braking.

Finally, the construction costs of known brake control valve systems could be further simplified if it were possible to eliminate the valve, previously required, which during emergency braking switches so as to vent the control chamber through a nozzle, with the objective of assuring that the high pressure exhaust valve system is returned by spring force to its original position within a predetermined time. Such a valve, which is required in prior art brake control valve systems, could be eliminated if the valve in question could be so arranged between such selected spaces that it comes into play only during emergency braking, without a supplemental valve.

Incidentally, the high pressure emergency exhaust valve system of U.S. Pat. No. 4,043,605 has the drawback that the high pressure valve is in the form of a gate valve with O-rings, and that, for rapid cutting through of the valve system during emergency braking, the air of the control chamber must be substantially vented from the piston chamber on one side of the control piston which switches the valve system. To enable the most rapid possible venting of the said piston chamber, which assures sufficiently rapid switching of the high pressure exhaust valve system, the above-noted patent requires a supplemental and expensive gate valve arrangement controlled by the emergency brake piston, in order to bleed additional air from the piston chamber to atmosphere during emergency braking.

OBJECT OF THE INVENTION

The object of the invention is a brake control valve arrangement, of the type described hereinabove, which is greatly simplified as regards construction and repair costs without sacrifice of performance and safety functions. This requires that the emergency brake piston be so constructed that, in controlling a brake accelerator inlet valve and a control chamber exhaust valve, both seated valves, it has sufficiently great switching sensitivity and sufficiently rapid switching speed during emergency braking. At the same time, it should be possible to select an effective piston surface of the emergency braking piston of substantially the same size as that of the service brake piston. Additionally or solely, it should be possible to omit the valve for switching in the nozzle which vents the control chamber after emergency braking, for switching the high pressure exhaust valve system back to atmosphere. Moreover, without use of slide valves, the high pressure exhaust valve system is to have a high switching speed during emergency braking, without provision of auxiliary control chamber exhaust valve systems to be controlled by the emergency brake piston.

Preferably the brake control valve system according to the invention comprises both the improved emergency brake piston and the improved high pressure emergency vent valve system, and the effective diameters of the emergency brake piston and the service brake piston are of substantially equal size.

BRIEF DESCRIPTION OF THE DRAWINGS

In order that the invention may be more clearly understood, reference will now be made to the accompanying drawings, in which an embodiment of the invention is shown for purposes of illustration, and in which FIG. 2 is a detail schematic view of the emergency brake component of the system shown in FIG. 1.

DESCRIPTION OF PREFERRED EMBODIMENT

Figure 1:
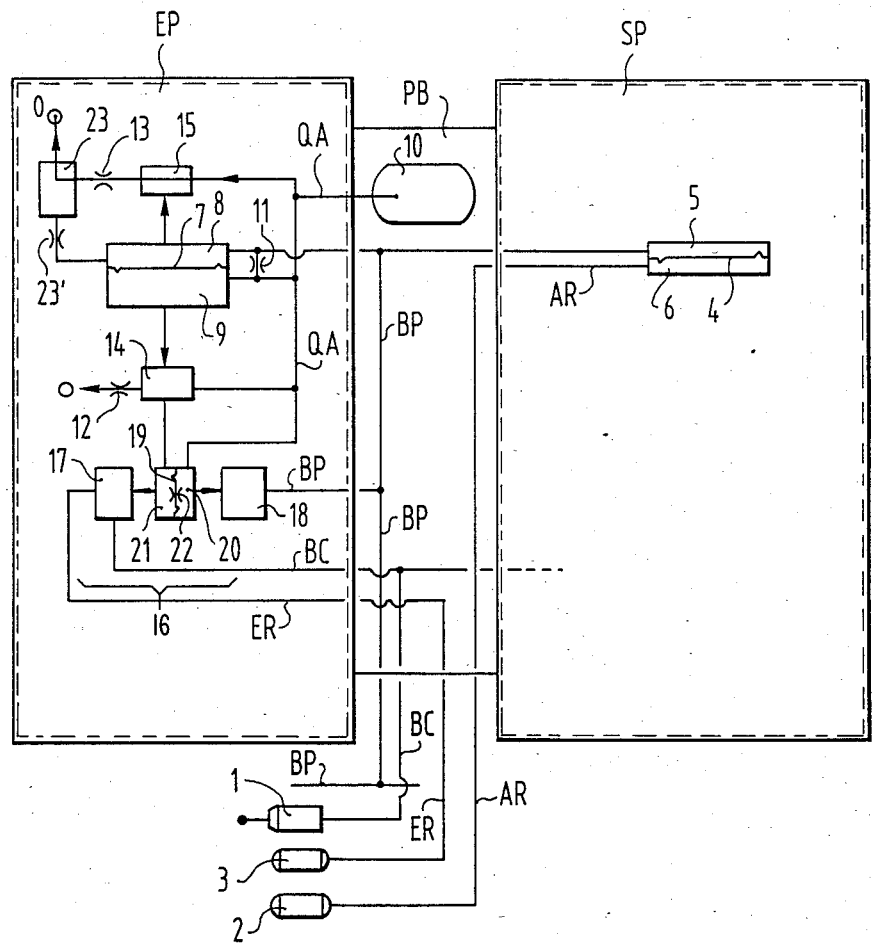
FIG. 1 is a schematic diagram showing the brake control valve system according to the invention.

FIG. 1 shows schematically a brake control valve system for a single release air brake for rail vehicles. The system consists of a service brake unit SP and an emergency brake unit EP, which are pneumatically interconnected through a central conduit connection element PB. The brake control valve system is attached via element PB to the brake line carried through the rail vehicle.

To control a brake cylinder 1, the brake control valve system is further connected to an emergency air container through an auxiliary air line to an auxiliary air container and through an emergency air line to an emergency air container.

Of the service brake unit SP, only the conventional service brake piston 4 is shown, one of whose piston chambers (5) is attached to the brake line conduit, and the other of whose piston chambers (6) is connected to the auxiliary air conduit.

Emergency brake unit EP particularly contains an emergency brake piston 7, one of whose piston chambers (8) is also attached to the brake line conduit BP, and the other of whose piston chambers (9) is connected via a quick action conduit with a control chamber 10 (to be identified as QA chamber 10 hereinafter) which is connected to brake line conduit BP through a filler nozzle 11. Piston chambers 8 and 9 will be referred to hereinafter as BP piston chamber 8 and QA piston chamber 9.

During service braking, the pressure relating to the selected degree of braking is reduced in the BP conduit by a predetermined value per unit of time, i.e., by a predetermined pressure gradient, without exceeding a predetermined limiting value. Brake cylinder 1 is loaded during service braking with a pressure from the auxiliary air chamber (hereinafter AR chamber) corresponding to the said pressure gradient. Service brake unit SP thereby controls the pressure in the brake cylinder during every service braking by its service brake piston 4. Emergency brake unit EP, on the other hand, controls by its emergency brake piston 7 during every service braking whether the selected lower limiting value for maximal pressure reduction per unit of time is exceeded in the brake line conduit.

Should this limiting value be exceeded, the emergency brake piston causes emergency braking. To enable the emergency brake piston to fulfill this monitoring function, two quick action vent nozzles 12 and 13 are provided, respectively connected to QA chamber 10 through valve systems 14 and 15. The latter are controlled by emergency brake piston 7, whereby upon pressure reduction in the brake line conduit the pressure in the QA chamber is reduced to the extent necessary to produce the predetermined brake line/quick action pressure ratio in the brake line conduit and the QA chamber, or in piston chambers 8 and 9 of emergency brake piston 7.

If the limiting value for maximum pressure reduction in the brake line conduit selected for a service braking is exceeded, the two parallel quick action vent nozzles are incapable of bringing the quick action pressure in the QA chamber quickly enough to the corresponding level of the reduced brake line pressure in the brake line conduit. The result is that a third valve 16 is controlled via valve system 14 controlled by emergency brake piston 7, this third valve monitoring a high pressure valve 17 and a brake line quick exhaust valve 18. The high pressure valve, upon emergency braking caused by emergency brake piston 7, connects brake cylinder 1 to the emergency air container, and quick exhaust valve 18 vents the brake line conduit over a large cross-section directly to atmosphere.

The third valve 16 (to be identified hereinafter as high pressure quick exhaust valve 16) has a control piston 19 with one control piston chamber (20) connected to QA chamber 10 and a second control piston chamber (21) connected to the first valve 14.

The two control piston chambers 20 and 21 are interconnected through a control piston back switching nozzle 22 which functions only during emergency braking. Upon such emergency braking, chamber 21 is vented via valve system 14 and its associated QA exhaust nozzle 12, so that control piston 19 is acted upon by the quick action pressure in order to act upon high pressure valve 17 and brake line quick exhaust valve 18. Upon emergency braking within a predetermined time, QA chamber 10 is vented via nozzle 22 and control piston chamber 21 and first valve system 14, so that control piston 19 is returned by spring force to its position prior to emergency braking.

Valve system 14 comprises a quick action connecting valve and a quick action exhaust valve. The QA chamber is connected to the control valve chamber 21 by the open quick action connecting valve, and is connected to atmosphere by the open quick action exhaust valve via quick action exhaust nozzle 12, as long as the quick action connecting valve is also open. If the latter is closed, then only control piston chamber 21 is connected to atmosphere via exhaust valve 12 when the quick action valve is open. For this reason, valve system 14 will be referred to as quick action connecting/exhaust valve system 14.

The other valve system (to be referred to hereinafter as QA exhaust valve 15) connects QA chamber 10 to the atmosphere during service braking via a further quick action exhaust nozzle 13 and a service brake accelerator 23. The latter, which is operative during every braking stage, is also connected to the brake line conduit via a nozzle 23'. When energized by quick action pressure, service brake accelerator 23 pulsatingly bleeds brake line air from brake line conduit to atmosphere.

Valve system 14, on the other hand, comprises, in addition to the quick action connecting valve, the second quick action exhaust valve with the second quick action exhaust nozzle.

As discussed in detail hereinbelow, it is particularly important that the volume of the QA piston chamber 9 of emergency brake piston 7 connected to QA chamber 10 be several times as large as the volume of the other brake line piston chamber 8 attached to the brake line conduit. This makes it possible to select an effective surface of emergency brake piston 7 which is the same size as the effective surface of service brake piston 4, the latter having a minimum size which, for the emergency brake piston, is considerably larger than is functionally necessary.

Despite the relative large piston surface of emergency brake piston 7, the latter, thanks to the large volume of QA piston chamber 9, switches during emergency braking sufficiently rapidly into emergency braking position to permit switching of high pressure valve 17 during the predetermined brief time span to connection of the emergency air container with brake cylinder 1 and BP quick exhaust valve 18 to large cross-section venting of the brake line conduit to atmosphere.

Because the effective surfaces of emergency brake piston 7 and service brake piston 4 are of the same size, the same piston diaphragms can be used for both, with attendant advantages both as to repairs and replacement part inventory.

By contrast with prior art brake control systems of the type described, the brake control valve according to the invention comprises two QA exhaust nozzles 12 and 13 which conduct quick action air from QA chamber 10 to atmosphere by way of separate valve systems 14 and 15, in order to maintain the predetermined brake line/quick action pressure ratio at emergency brake piston 7, as already set forth above.

During relatively small pressure reduction in the brake line conduit, with relatively small pressure gradients, conformation of the QA chamber pressure to that of the brake line is attained through the first quick action exhaust nozzle 13, without quick action air being bled to atmosphere also through the second quick action exhaust nozzle 12. Only with larger pressure gradients, in which the required quick action pressure reduction of QA chamber 10 can no longer be achieved through first quick action exhaust nozzle 13 alone, in order to maintain the brake line/quick action pressure ratio at emergency brake piston 7, the second quick action exhaust nozzle 12 is operative through the quick action connecting/exhaust valve system 14.

Thus, in the brake control valve system of the present invention, emergency brake piston 7 must not only have a sufficient switching speed for release of emergency braking, but also must have sufficient sensitivity to assure opening of the first quick action exhaust valve 15 even upon very slight pressure reductions, so as to allow the first quick action exhaust nozzle 13 to become effective. At the same time, there must be assurance that, with small brake line pressure gradients, the second quick exhaust nozzle 12 is not yet effectively connected to quick action connecting/exhaust valve system 14.

It follows that particular precautions must be taken at emergency brake piston 7, so that during slight pressure reductions with small brake line pressure gradients in the brake line conduit from emergency brake piston 7, only the first quick action exhaust valve 15 is opened, without also opening the second quick action exhaust valve of valve system 14, and that during larger pressure drops in the brake line conduit, with larger pressure gradients, both the first and second quick action exhaust valves are opened.

In other words, emergency brake piston 7 must assure that, in the case of small pressure reductions in the brake line with slight pressure gradients, only the first quick action exhaust nozzle 13 is effective, and that only at higher pressure gradients both nozzles 12 and 13 are jointly effective.

It has proven to be especially advantageous, for the purpose of conforming the quick action air in the QA chamber to the reduced brake line pressure in the brake line conduit, to provide, in contrast to prior art brake control valve systems, two quick action exhaust paths via two quick action exhaust nozzles 12 and 13, only the first nozzle 13 being effective during small pressure reductions in the brake line with slight pressure gradients, while both nozzles are jointly effective at higher pressure gradients. In this manner, the brake line/quick action pressure ratio at emergency brake piston 7 can be sensitively produced during all service brake stages. Moreover, this arrangement assures that the service brake accelerator 23 is supplied with sufficient quick action control air from the QA chamber even during small pressure reductions in the brake line conduit.

It is also particularly advantageous that in the brake control valve system of the present invention, the control piston back switching nozzle 22 can be accommodated in control piston 19 of the high pressure/emergency exhaust valve system 16. Since nozzle 22 becomes effective only when control piston chamber 21 of control piston 19 is switched to atmosphere via quick action connecting/exhaust valve system 14 during emergency braking, the valve required in prior art systems for effective incorporation of an analogous control piston back switching nozzle 22 during emergency braking can advantageously be eliminated.

Further advantages and improvements of the invention can be derived from the succeeding description of FIG. 2, which shows the emergency brake device EP of the valve system according to FIG. 1 in more detail.

FIG. 2 shows that quick action piston chamber 9 of emergency brake piston 7, which is connected to QA chamber 10 via conduit 24, has a substantially greater volume than brake line piston chamber 8, which is connected to the brake line conduit via conduit 25. If a large pressure reduction occurs in the brake line conduit with a relatively high pressure gradient, which is to produce emergency braking, then emergency brake piston 7 moves in the direction of brake line piston chamber 8 under quick action pressure in the quick action piston chamber 9. On the basis of the large volume of this chamber 9, which according to the invention is several times larger than the relatively small volume of brake line piston chamber 8, the expansion pressure loss occurring in chamber 9 as a result of its enlargement during movement of emergency brake piston 7 in the direction of brake line piston chamber 8 upon emergency braking is minimized, so that piston 7 can switch to its emergency braking position despite its excessive size. Piston diaphragm 7', which is tightly installed in the housing of emergency brake valve system EP, has the same size as the corresponding piston diaphragm of the service brake piston, not shown in FIG. 2. Corresponding diaphragm membranes 7' are also suited for the insertion of service brake piston 4 in FIG. 1, so that only one piston diaphragm size is necessary for both pistons.

The high pressure/emergency exhaust valve system 16 according to the invention consists of control piston 19 which controls high pressure valve 17 on one side and brake line emergency exhaust valve 18 on the other side. Piston 19 is designed as a stepped piston, whose effective piston surface 19' on one side is much larger than the effective other piston surface 19'' on its other side.

Piston chamber 20, which is delimited by the larger piston surface 19' of control piston 19, is in continuous communication with quick action piston chamber 9 of emergency brake piston 7, and hence QA chamber 10, via conduit 26. Piston chamber 21, which is delimited by substantially smaller piston surface 19'' of control piston 19, is connected to a valve chamber 28 of quick action/exhaust valve system 14 via conduit 27. Valve chamber 28 has two coaxial valve seats 29 and 30 between which is a valve closure member 31 which, in one of its closure positions, closes valve seat 29 while valve seat 30 is open, and which in its other closure position, closes valve seat 30 while valve seat 29 is open. In the central position of valve closure element 31, both valve seats 29 and 30 are open. With valve seat 29, element 31 forms quick action connecting valve 29, 31 and with valve seat 30 it forms the second quick action exhaust valve 30, 31.

Valve seat 29 is connected to quick action piston chamber 9, and hence to QA chamber 10, via a bore 29'. Valve seat 30 is coaxially opposite valve seat 29. A push rod 32 of a first dead lift device 33, through which emergency brake piston 7 is mechanically connected with valve closure element 31, projects displaceably with play through bore 29', element 31 being loaded by a spring 34 in the direction of valve seat 29.

Dead lift device 33 consists of a casing 35 held fast by emergency brake piston 7, the casing being guided for easy displacement between guide members 36, 37 within quick action piston chamber 9. Ends 38, 39 of the guide members jointly form a lift limiting stop for emergency brake piston 7. A guide element 40, displaceable within casing 35, supports a spring 41 which is attached to the bottom of casing 35 and loads guide element 40 in the direction of valve chamber 28. At least one projection 42 extending inwardly is provided at the forward end of casing 35 to stop guide element 40. One end of push rod 32 is held by guide element 31. In the illustrated position of emergency brake piston 7, valve closure element 31 is forced by push rod 32 against the force of spring 34 onto valve seat 30, which is located at the end of a channel 43 leading to atmosphere, into which the second quick action exhaust valve nozzle 12 is connected. Thus, in the illustrated position of emergency brake piston 7, venting of quick action piston chamber 9 via bore 29', open valve seat 29 and valve chamber 28, and thus also venting of the QA chamber to atmosphere, is blocked. On the other hand, piston chamber 21 of control piston 19 is connected to piston chamber 9 of the emergency brake piston via conduit 27, valve chamber 28, open valve seat 29 and bore 29'. Correspondingly, venting of piston chamber 20 of the control piston to atmosphere is prevented by blocked valve seat 30.

The first quick action exhaust valve 15 consists of a valve chamber 44 with a valve seat 45 which is connected to brake line piston chamber 8 of emergency brake piston 7 by a bore 46. A piston 47 is pressure tightly displaceable in bore 46, and is supported on emergency brake piston 7. At its forward end, piston 47 carries a push rod 48 which projects with play through valve seat 45. At the free end of this push rod, a valve closure element 49 is supported which is arranged in valve chamber 44 and is there loaded by a valve spring 50 in closure position of valve seat 45.

Thus, emergency brake piston 7 is acted upon by valve spring 50 via valve closure element 49, push rod 48 and piston 47, as well as a supplemental piston spring 50' within brake line piston chamber 8, always in the direction of quick action piston chamber 9. In the opposite direction, emergency brake piston 7 is acted upon by spring 41 which is supported by valve closure element 31. When guide element 40 of dead lift device 33 is stopped in casing 35 of emergency brake piston 7, spring 34 becomes operative.

Springs 50 and 50' are jointly stronger than spring 34, and spring 41 is also stronger than spring 34. Obviously, spring 50' can be omitted if spring 50 of the first quick action exhaust valve 15 is of sufficient strength. On the other hand, it is advantageous to transfer a portion of the desired total spring force to spring 50' at emergency brake piston 7, so that spring 50 can be made relatively weak, whereby the first quick action exhaust valve 15 is easily switchable.

The dead lift of dead lift device 33 is designated in FIG. 2 by "s". If, in the pressure free condition of emergency brake system EP shown in FIG. 2, valve closure element 31 is held in closure position opposite quick action exhaust valve seat 30 by push rod 32 loaded by dead lift spring 41, then the forward end of guide element 40 is located at distance s from projections 42 for stopping guide element 40.

Thus, while dead lift device 33 with a predetermined dead lift s is inserted between quick action connecting-/exhaust valve system 24 and emergency brake piston 7, the first quick action exhaust valve 15 is in direct mechanical contact without a dead lift device with emergency brake piston 7 which controls it. If a small pressure reduction occurs in the brake line conduit, as provided for post-braking after service braking, then emergency brake piston 7 moves in the direction of brake line piston chamber 8, whereby the first quick action exhaust valve 15 is opened via piston 47 and push rod 48 before quick action exhaust valve 29, 30 is opened. The reason is the existence of dead lift s of dead lift device 33.

When the first quick action exhaust valve 15 is open and the second quick action exhaust valve 29, 30 is closed, quick action air is bled to atmosphere from QA chamber 10 via conduit 51 with the first quick action exhaust nozzle 13, to such an extent that the required brake line/quick action pressure ratio at the emergency brake piston is maintained.

The quick action air flowing to zero through first quick action exhaust nozzle 13 serves to actuate pulsating service brake accelerator 23, as proposed, e.g., in U.S. patent application No. 492,318. The invention is not, however, limited to such a service brake accelerator. U.S. Pat. Nos. 3,716,276; 4,103,977; 4,157,849 and 4,206,949 disclose other pulsating service brake accelerators operated by quick action air from the QA chamber, and these can be used in the same manner in the brake control valve system of the present invention.

Even during creeping pressure reductions in the brake line conduit resulting from leaks, the first quick action exhaust valve 15 is slightly opened, to permit corresponding amounts of quick action air to flow from QA chamber via the first quick action exhaust valve 15 and conduit 51 to zero for the maintenance of the brake line/quick action pressure ratio at the emergency brake piston, without involvement of the second quick action exhaust valve 30, 31 or of the brake accelerator.

The first quick action exhaust nozzle 13 is thus so dimensioned that, on the one hand, it can accommodate a quick action pressure adaptation of the QA chamber to the brake line pressure in the brake line conduit at relatively small pressure reductions per unit of time in the brake line conduit, without it being necessary for the second quick action exhaust nozzle to be effective via valve system 14, and that on the other hand, the quick action air flowing to zero through quick action exhaust valve 13 is only suited for certain operations of the pulsating service brake accelerator 23 from a predetermined minimum pressure on, this accelerator then having to operate reliably at all service braking levels, including even the smallest.

At higher service braking levels, in which there is a relatively greater pressure reduction in the brake line conduit with a correspondingly higher pressure gradient, the first quick action exhaust nozzle 13 is no longer sufficient to maintain the required brake line/quick action pressure exhaust pressure ratio at the emergency brake piston. The latter is then displaced in the direction of brake line piston chamber 8 with a lift which is slightly greater than dead lift s of dead lift device 31, so that valve closure element 31 opens the second quick action exhaust valve seat 30 without however closing the opposite quick action connecting valve seat 29. At greater pressure reductions in the brake line conduit per unit of time, the required quick action pressure reduction is thus assured until attainment of the brake line/quick action pressure ratio through the two quick action exhaust nozzles 12 and 13, which are effective via the opened first and second quick action exhaust valves 15 and 30, 31. Because there are two quick action exhaust nozzles 12, 13 with varying cross-sections, the second nozzle 12 of which only becomes effective when the first nozzle 13 is already effective, and through which even small amounts of quick action air can flow through to zero without involving the brake accelerator 23, wear of the emergency brake piston can be substantially reduced.

In the event of a pressure reduction per unit of time in the brake line conduit of a magnitude so extraordinary that a predetermined limiting value is exceeded and the emergency brake piston is switched in the direction of its brake line piston chamber into the emergency braking position for emergency braking, then push rod 32 is carried along with guide element 40 held in piston casing 35 of emergency brake piston 7, so that valve closure element 30, through the force of spring 34, can fully open the second quick action exhaust valve seat 31 and close quick action connecting valve seat 29. Upon closure of quick action connection valve 29, 31, the connection between quick action piston chamber 9 of the emergency brake piston to control chamber 21 of control piston 19 is interrupted, this now being switched via the opened second quick action exhaust valve 30, 31 and the second quick action exhaust nozzle 12 to atmosphere.

Due to rapid quick action pressure reduction in control piston chamber 21 of control piston 19, the substantially unaltered quick action pressure in the other control piston chamber 20 becomes effective for switching control piston 19 in the direction of the vented control piston chamber 21.

The structure of control piston 19 will now be described in more detail.

As already explained, control piston 19 is formed as a stepped piston. One of its chambers, 20, having the larger piston surface, is attached continuously to quick action piston chamber 9 of emergency brake piston 7, while the other of its chambers, 21, having a substantially smaller piston surface of control piston 19, is attached to exhaust chamber 28 of the quick action connection/exhaust valve system 14.

The smaller piston surface is connected to a valve plate 53 of large cross-section by a rigid piston rod 52, plate 53 forming, jointly with brake line exhaust valve seat 54, the brake line emergency exhaust valve 18, which upon emergency braking switches the brake line conduit for rapid pressure reduction of the brake line pressure via large cross-section to atmosphere. At its large piston surface, control piston 19 has a recess 5 displaceably engaged by one end of a piston 56, and containing a spring 57 loading piston 56, which is guided for pressure tight displacement in a bore 58. The other end of piston 56 is actuated by a push rod 59 which is supported on a valve closure element 60 forming, together with a valve seat 61, the high pressure valve 17. Valve closure body 60 is loaded by a spring 62 in the opening direction of high pressure valve 17. At the same time, control piston 19 is loaded by a return spring 63 in closure direction on the side of its smaller piston surface as well as of the brake line emergency exhaust valve 18 and of high pressure valve 17.

In the illustrated pressure free position of high pressure/emergency exhaust valve system 16, both return spring 63 and spring 55 are made stronger than valve spring 62, so that, as shown in FIG. 2, valve closure element 60 is pressed onto valve seat 61 against the force of a valve spring 62. At the same time, brake line emergency exhaust valve 18 is closed.

In order to retain both valves 17 and 18 simultaneously in shut-off position via control piston 19, piston 56 with spring 55 is formed as a second dead lift device 55–59 in the recess of control piston 19 and the push rod 59. For this purpose, the spring-loaded piston end of piston 56 is caught within recess 57 after a predetermined piston rise h of control piston 19 in the opening direction of both valves 17 and 18, with the aid of projections 64 radially inwardly extending into recess 55 of the control piston, piston 56 abutting against these projections with a collar 65 which supports spring 57 in recess 55 of the control piston.

Dead lift h of dead lift device 55-59 assures that, upon displacement of control piston 19 in the opening direction of both valves 17 and 18, first brake line emergency exhaust valve 18 and then high pressure valve 17 is opened, after control piston 19 has covered the distance h.

Upon emergency braking, control piston 19 switches to opening of both valves 17 and 18 and in the indicated sequence, after control piston chamber 21 is switched to atmosphere via the second quick action exhaust valve 12 by closing of quick action connecting valve 19, 31 and opening of the second quick action exhaust valve 30, 31.

On the basis of its stepped piston configuration, control piston 19 already switches during emergency braking before the quick action pressure in its control piston chamber 21 reaches zero, i.e., it switches while there is still a certain quick action pressure difference between the two control piston chambers 20 and 21.

This makes it possible to provide a bore 66 in control piston 19 which interconnects the two control piston chambers 20 and 21, and to insert control piston return switching nozzle 22 into this bore 66, this nozzle becoming effective upon closure of quick action connecting valve 29, 31 and opening of the second quick action exhaust valve 30, 31, i.e., upon emergency braking, during which emergency brake piston 7 has assumed its previously described emergency braking position.

On the basis of the step effect of control piston 19, return switching nozzle 22 does not prevent its rapid switching during emergency braking. The cross-section of nozzle 22 is so selected that the quick action air from the QA chamber 10 is vented to atmosphere after emergency braking during a predetermined time to such an extent that control piston 19 is immediately moved back to its original position by return spring 63, in which position both valves 17 and 18 are again closed.

Because control piston return switching nozzle 22 becomes effective only upon emergency braking initiated by emergency braking piston 7, there is no need for a particular valve loaded by brake line pressure, of the type disclosed, e.g., in U.S. Pat. No. 4,043,605, which switches in the opening direction upon emergency braking caused by brake line pressure reduction, in order to vent QA chamber 10 by connecting it to the brake line conduit.

Such a valve is not required for the high pressure/emergency exhaust valve system 16 of the present invention. Here, QA chamber 10 is switched to atmosphere during emergency braking via nozzle 22, the second open quick action exhaust valve 30, 31 and the second quick action exhaust nozzle 12. Through location in bore 66 of control piston 19, nozzle 22 becomes effective only when emergency brake piston 7 has caused emergency braking. Nozzle 22 has no influence on the rapid switching of control piston 19 during emergency braking, since the latter is preferably in the form of a stepped piston, so that it can switch already when there is a quick action pressure differential between the two control piston chambers 20 and 21.

During emergency braking release, quick action air can thus flow from control piston chamber 20 into control piston chamber 21, without thereby influencing the switching of the control piston.

The high pressure/emergency exhaust valve system 16 according to the invention has the further advantage that, thanks to the second dead lift device 55-59, both high pressure valve 17 and brake line emergency exhaust valve 18 can be formed as seated valves. In this manner, dead lift h of the second dead lift device can be made very small, so that the switching sequence of valves 17 and 18 can be very small, and in particular, smaller than where the high pressure valve is a gate valve, as is the case in U.S. Pat. No. 4,043,605. In order to open such gate valve, the correspondihg control piston must cover a relatively long path of travel, larger than dead lift h. Such a relatively large switching lift occurs in the prior art brake control valve system only when the quick action pressure on one side of the control system is largely gone; this is not necessary in applicant's structure because of the stepped configuration of control piston 19.

In summary, the high pressure/emergency exhaust valve device 16 according to the invention is of particular advantage because (1) it makes possible a relatively small switching path for the required switching sequence of the two valve seats 17 and 18;

(2) the staggered switching of valves 17 and 18 requires less switching power from control piston 19 than would be the case if the latter, as in U.S. Pat. No. 4,043,605, were to cause switching of both valves simultaneously;

(3) switching of control piston 19 is already attained, for various reasons, when the quick action pressure in chamber 21 has not yet been reduced to substantially zero, as is required in U.S. Pat. No. 4,043,605; and (4) without disadvantages for rapid switching of valves 17 and 18, nozzle 22 can be inserted in a bore 66 of control piston 19, which nozzle permits a predetermined quick action venting to zero via chamber 21 during emergency braking, a special valve for quick action venting during emergency braking not being necessary.

What is claimed is:

1. Brake control valve system for an indirectly operating air rake for rail vehicles, comprising:
   (a) a service brake unit (SP);
   (b) an emergency brake unit (EP);
   (c) a service brake piston (4) forming part of said service brake unit (SP) and having first and second piston chambers (5, 6) located on opposite sides of said service brake piston (4), the first (5) of said chambers being connected to a brake line, and the second (6) of said chambers being connected to an auxiliary air container (2);
   (d) an emergency brake piston (7) forming part of said emergency brake unit (EP) for controlling emergency braking, and having first and second piston chambers (8, 9) located on opposite sides of said emergency brake piston (7), the first (8) of said piston chambers being connected to said brake line, and the second (9) of said piston chambers being connected to a control chamber (10) and being switched to said brake line via a filling nozzle (11), said second piston chamber (9) having a volume several times as great as the volume of said first piston chamber (8);
   (e) a high pressure/exhaust valve system (16) comprising a control piston (19) for (i) controlling a high pressure valve (17) which connects an emergency air container (3) to a brake cylinder (1) during emergency braking, and (ii) for controlling a brake line emergency exhaust valve (18) which switches said brake line to a vent of large cross-section during emergency braking;
(f) a first channel (26) continuously connecting a first control piston chamber (20) on one side of said control piston (19) to said control chamber (10);
(g) a second channel (27) connecting a second control piston chamber (21) on the other side of said control piston (19) to a valve chamber (28);
(h) a control chamber connecting/exhaust valve system (14) surrounding said valve chamber (28) and comprising
  (i) coaxial first and second valve seats (29, 30) forming part of said valve chamber (28) and a common valve closure element (31) within said valve chamber for forming a control chamber connecting valve (29, 31) from said first valve seat (29) at the end of a third channel (29' and said valve closure element (31), said third channel (29') comprising a bore connecting said second piston chamber (9) to said valve chamber (28) through said first valve seat (29), and
  (ii) a control chamber exhaust valve (30, 31) from said second valve seat (30) at the end of a fourth channel (43) and said valve closure element (31) with a control chamber exhaust nozzle (12) switched into said fourth channel;
(i) a first mechanical coupling device (33) between said valve closure element (31) and said emergency brake piston (7);
(j) a pulsating brake accelerator (23) operating at every stage of service braking and connected to said control chamber (10) by a brake accelerator inlet nozzle (13) within a fifth channel (51);
(k) a brake accelerator inlet valve device (15) between said control chamber (10) and said brake accelerator inlet nozzle (13);
(l) a second mechanical coupling device (48, 47) between said brake accelerator inlet valve device (15) and a first dead lift device switched into said first coupling device (33) for assuring that said brake accelerator inlet valve device (15) is switched to open position by said emergency brake piston before said control chamber exhaust valve (30, 31) and to closed position after said valve;
(m) the first dead lift device having a push rod (32) which reaches through said bore (29') and said first valve seat (29), said push rod being supported against said valve closure element (31), which is biased by spring means (34) into opening direction of said control chamber exhaust valve (30, 31).

2. Brake control valve system according to claim 1, wherein said second piston chamber (9) is provided with guide means (36, 37) for a casing (35) fast with said emergency brake piston (7) for receiving said first dead lift device, ends (38, 39) of said guide means (36, 37) forming a lift limiting stop for said emergency brake piston (7) in said second piston chamber (9).

3. Brake control valve system according to claim 1, wherein the operative diameters of said emergency brake piston (7) and said service brake piston (4) are substantially identical.

4. Brake control valve system according to any preceding claim, wherein said control piston (19) is a stepped piston having operative piston surfaces on each of two sides, the piston surface on the first side being substantially larger than the piston surface on the second side, said first control piston chamber (20) being delimited by the larger of said piston surfaces, and said second control piston chamber (21) being delimited by the smaller of said piston surfaces, said first and second control piston chambers being connected by a bore (66) in said control piston (19), said bore having a control piston back switching nozzle (22) operative only during emergency braking.

5. Brake control valve system according to claim 4, wherein said high pressure valve (17) and said brake line exhaust valve (18) are both seated valves, a third coupling device (55-59) being provided between said control piston (19) and said high pressure valve (17), a fourth coupling device (52) being provided between said control piston (19) and said brake line emergency exhaust valve (18), a second dead lift device being switched into said third coupling device (55-59), whereupon said high pressure valve (17) is moved to open position by spring means (62) after said control piston (19) has traversed a dead lift (h) in the opening direction of said brake line exhaust valve (18).

6. Brake control valve system according to claim 5, wherein a valve closure member (60) of said high pressure valve (17) is biased in opening direction by a first valve spring (62), a valve closure element (53) of said brake line emergency exhaust valve (18) rigidly connected to said stepped piston being biased in closing direction by a second valve spring (63), a dead lift spring (57) located in a recess (55) of said stepped piston loading a valve element (65) displaceable in said recess, a push rod (59) switched between said valve (17) and said dead lift element (65) for retaining the latter during closure of said high pressure valve (17) and said brake line emergency exhaust valve (18), at a desired dead lift (h) at a distance from surfaces (64) projecting into said recess (55) for arresting said dead lift element (65).

7. Brake control valve system for indirectly operating air brake for rail vehicles, comprising:
(a) a service brake unit (SP);
(b) an emergency brake unit (EP);
(c) a service brake piston (4) forming part of said service brake unit (SP) and having first and second piston chambers (5, 6) located on opposite sides of said service brake piston (4), the first (5) of said chambers being connected to a brake line, and the second (6) of said chambers being connected to an auxiliary air container (2);
(d) an emergency brake piston (7) forming part of said emergency brake unit (EP) for controlling emergency braking, and having first and second piston chambers (8, 9) located on opposite sides of said emergency brake piston (7), the first (8) of said piston chambers being connected to said brake line, and the second (9) of said piston chambers being connected to a control chamber (10) and being switched to said brake line via a filling nozzle (11), said second piston chamber (9) having a volume several times as great as the volume of said first piston chamber (8);
(e) a high pressure/exhaust valve system (16) comprising a control piston (19) for (i) controlling a high pressure valve (17) which connects an emergency air container (3) to a brake cylinder (1) during emergency braking, and (ii) for controlling a brake line emergency exhaust valve (18) which switches said brake line to vent of large cross-section during emergency braking;
(f) a first channel (26) connecting a first control piston chamber (20) on one side of said control piston (19) to said control chamber (10);
(g) a second channel (27) connecting a second control piston chamber (21) on the other side of said control piston (19) to a valve device (14) which during service braking also connects said second control piston chamber (21) to said control chamber (10), and which during emergency braking breaks the connection of said second control chamber (21) with said control chamber (10) and connects said second control piston chamber (21) to atmosphere via a control chamber exhaust valve (12);
(h) said first and second control piston chambers (20, 21) being connected by a bore (66) in said control piston (19), said bore containing a control chamber exhaust nozzle (22) which is operative only during emergency braking.

8. Brake control valve system according to claim 7, wherein said control piston (19) is a stepped piston having operative piston surfaces on each of two sides, the piston surface on the first side being substantially larger than the piston surface on the second side, said first control piston chamber (20) being delimited by the larger of said piston surfaces, and said second control piston chamber (21) being delimited by the smaller of said piston surfaces.

9. Brake control valve system according to claim 7 or 8, wherein said high pressure valve (17) and said brake line exhaust valve (18) are both seated valves, a first mechanical coupling device (55-59) being provided between said control piston (19) and said high pressure valve (17), a second mechanical coupling device (52) being provided between said control piston (19) and said brake line emergency exhaust valve (18), a dead lift device being switched into said first mechanical coupling, whereupon said high pressure valve (17) is moved to open position by spring force after said control piston (19) has traversed a dead lift (h) in the opening direction of said brake line emergency exhaust valve (18).

10. Brake control valve system according to claim 7 or 8, wherein a valve closure member (60) of said high pressure valve (17) is biased in opening direction by a first valve spring (62), a valve closure element (53) of said brake line emergency exhaust valve (18) rigidly connected to said stepped piston being biased in closing direction by a second valve spring (63), a dead lift spring (57) located in a recess (55) of said stepped piston loading a valve element (65) displaceable in said recess, a push rod (59) switched between said valve (17) and said dead lift element (65) for retaining the latter during closure of said high pressure valve (17) and said brake line emergency exhaust valve (18), at a desired dead lift (h) at a distance from surfaces (64) projecting into said recess (55) for arresting said dead lift element (65).

11. Brake control valve system for indirectly operating air brake for rail vehicles, comprising:
(a) a service brake unit (SP);
(b) an emergency brake unit (EP);
(c) a service brake piston (4) forming part of said service brake unit (SP) and having first and second piston chambers (5, 6) located on opposite sides of said service brake piston (4), the first (5) of said chambers being connected to a brake line, and the second (6) of said chambers being connected to an auxiliary air container (2);
(d) an emergency brake piston (7) forming part of said emergency brake unit (EP) for controlling emergency braking, and having first and second piston chambers (8, 9) located on opposite sides of said emergency brake piston (7), the first (8) of said piston chambers being connected to said brake line, and the second (9) of said piston chambers being connected to a control chamber (10) and being switched to said brake line via a filling nozzle (11), said second piston chamber (9) having a volume several times as great as the volume of said first piston chamber (8);
(e) a high pressure/exhaust valve system (16) comprising a control piston (19) for (i) controlling a high pressure valve (17) which connects an emergency air container (3) to a brake cylinder (1) during emergency braking, and (ii) for controlling a brake line emergency exhaust valve (18) which switches said brake line to a vent of large cross-section during emergency braking;
(f) a first channel (26) connecting a first control piston chamber (20) on one side of said control piston (19) to said control chamber (10);
(g) a second channel (27) connecting a second control piston chamber (21) on the other side of said control piston (19) to a valve device (14) which during service braking also connects said second control piston chamber (21) to said control chamber (10), and which during emergency braking breaks the connection of said second control chamber (21) with said control chamber (10) and connects said second control piston chamber (21) to atmosphere via a control chamber exhaust valve (12);
(h) said control piston (19) being a stepped piston having operative piston surfaces on each of two sides, the piston surface on the first side being substantially larger than the piston surface on the second side, said first control piston chamber (20) being delimited by the larger of said piston surfaces, and said second control piston chamber (21) being delimited by the smaller of said piston surfaces.

12. Brake control valve system according to claim 11, wherein wherein said high pressure valve (17) and said brake line exhaust valve (18) are both seated valves, a first mechanical coupling device (55-59) being provided between said control piston (19) and said high pressure valve (17), a second mechanical coupling device (52) being provided between said control piston (19) and said brake line emergency exhaust valve (18), a dead lift device being switched into said first mechanical coupling, whereupon said high pressure valve (17) is moved to open position by spring force after said control piston (19) has traversed a dead lift (h) in the opening direction of said brake line emergency exhaust valve (18).

13. Brake control valve system according to claim 12, wherein a valve closure member (60) of said high pressure valve (17) is biased in opening direction by a first valve spring (62), a valve closure element (53) of said brake line emergency exhaust valve (18) rigidly connected to said stepped piston being biased in closing direction by a second valve spring (63), a dead lift spring (57) located in a recess (55) of said stepped piston loading a valve element (65) displaceable in said recess, a push rod (59) switched between said valve (17) and said dead lift element (65) for retaining the latter during closure of said high pressure valve (17) and said brake line emergency exhaust valve (18), at a desired dead lift (h) at a distance from surfaces (64) projecting into said recess (55) for arresting said dead lift element (65).

14. Brake control valve system according to any one of claims 11 to 13, wherein said first and second control piston chambers (20, 21) are connected by a bore (66) in said control piston (9), said bore containing a control piston back-switching nozzle (22) which is operative only during emergency braking.

* * * * *